United States Patent
Watts et al.

(10) Patent No.: US 12,553,103 B2
(45) Date of Patent: Feb. 17, 2026

(54) DISSOLUTION PROCESS

(71) Applicant: WATTS & FISHER PTY LTD, Western Australia (AU)

(72) Inventors: Harry Philip Watts, Western Australia (AU); Tonya Jean Fisher, Western Australia (AU)

(73) Assignee: WATTS & FISHER PTY LTD, Western Australia (AU)

( * ) Notice: Subject to any disclaimer, the term of this patent is extended or adjusted under 35 U.S.C. 154(b) by 693 days.

(21) Appl. No.: 17/776,808

(22) PCT Filed: Nov. 20, 2020

(86) PCT No.: PCT/AU2020/051251
§ 371 (c)(1),
(2) Date: May 13, 2022

(87) PCT Pub. No.: WO2021/097527
PCT Pub. Date: May 27, 2021

(65) Prior Publication Data
US 2022/0403482 A1    Dec. 22, 2022

(30) Foreign Application Priority Data
Nov. 21, 2019    (AU) .............................. 2019904403

(51) Int. Cl.
| | | |
|---|---|---|
| *C22B 3/06* | (2006.01) | |
| *C22B 3/42* | (2006.01) | |
| *C22B 59/00* | (2006.01) | |
| *C22B 60/02* | (2006.01) | |

(52) U.S. Cl.
CPC .................. *C22B 3/06* (2013.01); *C22B 3/42* (2013.01); *C22B 59/00* (2013.01); *C22B 60/0243* (2013.01); *C22B 60/0265* (2013.01); *C22B 60/0291* (2013.01)

(58) Field of Classification Search
None
See application file for complete search history.

(56) References Cited

U.S. PATENT DOCUMENTS

2014/0373683 A1*  12/2014  Boudreault ............. C22B 58/00
                                                       75/743

FOREIGN PATENT DOCUMENTS

| AU | 2016201013 A1 | 3/2016 |
|---|---|---|
| CA | 2893310 A1 | 12/2016 |
| CN | 102312089 A | 1/2012 |
| RU | 2620229 C1 * | 5/2017 |

OTHER PUBLICATIONS

Phosphoric acids and phosphates Wikipedia.*
International Search Report for corresponding application PCT/AU2020/051251 filed Nov. 20, 2020; Mail date Feb. 5, 2021.
Written Opinion of the International Searching Authority for corresponding application PCT/AU2020/051251 filed Nov. 20, 2020; Mail date Feb. 5, 2021.

* cited by examiner

*Primary Examiner* — Jenny R Wu
(74) *Attorney, Agent, or Firm* — CANTOR COLBURN LLP

(57) ABSTRACT

The present invention relates to a process for recovering metals from metal-bearing material, said process comprising the step of contacting the metal-bearing material with condensed phosphoric acid at a temperature of greater than 215° C. and less than 300° C. for a period of time sufficient to at least partially dissolve the metal-bearing material; to provide a leaching solution containing metal ions. The invention is applicable to a range of metals including the rare earth elements, as well as thorium and uranium. The invention is applicable to a range of metal-bearing materials, particularly phosphate minerals such as monazite and xenotime.

18 Claims, 2 Drawing Sheets

DISSOLUTION PROCESS

PRIORITY DETAILS

The present application claims priority from Australian Provisional Patent Application No. 2019904403, the entire disclosure of which is incorporated herein by reference.

FIELD OF THE INVENTION

The present invention relates to a process for recovering metals from metal-bearing material. The invention is applicable to a range of metals including the rare earth elements, as well as thorium and uranium. The invention is applicable to a range of metal-bearing materials, particularly phosphate minerals such as monazite and xenotime.

BACKGROUND OF INVENTION

Metals, such as the rare earth elements, are in increasing demand for various purposes. Several of the lighter rare earths, from lanthanum to dysprosium, are used in the light-weight magnets and batteries of electric vehicles. Similar magnets are also used in the generators of wind turbines. In this sense, the future demand of rare earth elements is underpinned by a fundamental shift in the global economy towards renewable energy.

Rare earth elements (also known as rare earth metals) are generally taken to include the lanthanide series on the periodic table, from lanthanum to lutetium, as well as yttrium and scandium due to their similar chemical properties. The 17 rare-earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). They are often found in minerals with thorium (Th), and less commonly uranium (U), both of which are metal elements that are also of commercial value. Despite their name, rare earth elements are—with the exception of the radioactive promethium—relatively plentiful in Earth's crust. However, because of their geochemical properties, rare-earth elements are typically dispersed and not often found concentrated in rare earth minerals; as a result, economically exploitable ore deposits are less common.

Commercially, rare earth metals are often obtained from ores of phosphate minerals such as monazite. Monazite is a solid solution of mainly the lighter rare earths from lanthanum to gadolinium, with some yttrium as well. In its ideal form it has a ratio of one light rare earth to every phosphate. Monazite is radioactive due to the presence of thorium and, less commonly, uranium. Another phosphate mineral, xenotime, is often a key component of ores rich in monazite. Xenotime is a solid solution of mainly the heavy rare earths and yttrium. In its ideal form it has a ratio of one yttrium or heavy rare earth to every phosphate. Much like monazite, xenotime is radioactive due to the presence of small amounts of thorium and uranium.

Industrially, there are two conventional methods used for the breakdown of monazite; both use particularly harsh conditions. One is the application of 70% sodium hydroxide at higher than 140° C. to produce metal hydroxides and trisodium phosphate, the latter of which is also a commodity. However, this caustic cracking has difficulty breaking down xenotime which is often a key component of ores rich in monazite. In this case, sulphuric acid at a purity of 93% must be used at between 200° C. and 400° C. to produce metal sulphates.

Both of these conventional processes have been in industrial use for over 50 years (sulphuric acid for greater than 100 years, caustic for approximately 50 years) with no industrially suitable alternatives identified. Both methods do not directly dissolve the metals into solution; they merely convert the metals from one solid (metal phosphate) to another (sulphates or hydroxides respectively). This means that fine grinding of the monazite to maximise surface area for the solid-solid reaction, and extended residence times (in the order of 4 hours) are essential to achieving a reasonable recovery. Fine grinding and extended residence times both add significantly to the operating costs and capital costs due to the larger size of the plant.

Another problem of fine grinding monazite is the safety hazard posed by alpha radiation emitted by the monazite dust. Alpha radiation is particularly dangerous if the source particles of monazite are inhaled or ingested. All methods for decomposing monazite specify that the monazite particles be finely ground or pulverised to below 53 microns in diameter or 300 mesh, which significantly increases the risk of dust being inhaled or ingested.

There is therefore an ongoing need for a process of recovering metals from a metal bearing source, such as phosphate mineral, which at least partially addresses one or more of the above-mentioned shortcomings or provides a useful alternative.

It is a desired feature of the process of the present invention to develop a process where metals such as the rare earth elements, thorium and uranium may be recovered from a metal-bearing material in a manner that reduces the need for fine grinding of the source material which both improves safety and minimises costs.

It is a desired feature of the process of the present invention to develop a process where metals such as the rare earth elements, thorium and uranium may be recovered from a metal-bearing material in a manner that provides greater economic value in the recovery of the metal.

It is a desired feature of the process of the present invention to develop a process where metals such as the rare earth elements, thorium and uranium may be recovered from a metal-bearing material in a manner which minimises environmental impact of the process.

A reference herein to a patent document or other matter which is given as prior art is not to be taken as an admission that the document or matter was known or that the information it contains was part of the common general knowledge as at the priority date of any of the claims.

SUMMARY OF INVENTION

The present invention provides a process for recovering metals from metal-bearing material, said process comprising the step of contacting the metal-bearing material with condensed phosphoric acid at a temperature of greater than 215° C. and less than 300° C. for a period of time sufficient to at least partially dissolve the metal-bearing material; to provide a leaching solution containing metal ions.

In a preferred embodiment, the process of the present invention further comprises the step of at least partially extracting the metal ions from the leaching solution using sorbents and/or filtration, preferably using ion exchange resins. This allows for the at least partial recovery of the metal ions from the leaching solution.

In a preferred embodiment, the at least partial extraction of the metal ions from the leaching solution comprises diluting the leaching solution with deionised/distilled water; and contacting the diluted leaching solution with a sorptive material, wherein the sorptive material is a cationic ion exchange resin.

In a preferred embodiment, the process of the present invention further comprises the step of forming a precipitate containing metal ions from the leaching solution. This step can happen after the step of at least partially extracting the metal ions from the leaching solution using ion exchange resin or instead of it. Preferably, the precipitate is formed by modifying the pH or temperature of the leaching solution or by modifying the dielectric constant of the leaching solution. For example, the precipitate may be formed by cooling the leaching solution and adding orthophosphoric acid, water, alcohol, or mixtures thereof. The precipitate can be subject to further processing and recovery of the metals.

It is preferable that at least 70% of the metal-bearing material is dissolved in the condensed phosphoric acid, preferably at least 80%, more preferably at least 90%, even more preferably at least 95%, most preferably at least 99%. When dissolution of the metal-bearing material is partial, the process further comprises a step of separating the leaching solution from any undissolved leach solid. Preferably, the leaching solution is separated from the leach solid by decanting, by filtration, or by centrifugation; most preferably by decanting.

In a further preferred embodiment, the metal-bearing material comprises a monazite concentrate, wherein the monazite concentrate comprises minerals selected from the list comprising monazite, silicates, zircon, xenotime and mixtures thereof. Preferably, the metal-bearing material has a particle size of less than 0.5 mm in diameter, preferably between 100 μm and 400 μm. This avoids the need for fine-grinding of the metal-bearing material which both improves safety and minimises costs.

In some preferred embodiments, the process is particularly suitable for the recovery of the metals selected from the list comprising lanthanum, cerium, neodymium, praseodymium, yttrium, samarium, gadolinium, scandium, thorium, uranium and mixtures thereof. Thus, the recovery of commercially valuable rare earth metals, as well as thorium and uranium, is provided in a manner that provides greater economic value in the recovery of the metal.

It is preferred that the process of the present invention is conducted at a temperature of between 230° C. and 275° C., preferably around 265° C. At these temperatures, the condensed phosphoric acid comprises a balance of orthophosphoric acid, pyrophosphoric acid, triphosphoric acid and minimal water sufficient to allow the process of the present invention to be carried out with shorter residence times than conventional processes.

In further preferred embodiments, the period of time sufficient to at least partially dissolve the metal-bearing material is between 5 and 60 minutes, preferably around 15 minutes. This is a significant improvement on the long residence times required by conventional processes.

In a preferred embodiment, the amount of metal-bearing material added to the condensed phosphoric acid is between around 50 and 350 g/L, preferably around 250 g/L. In a further preferred embodiment, the amount of metal-bearing material added to the condensed phosphoric acid is sufficient to provide a concentration of metal ions dissolved in the leaching solution of up to around 130 g/L, preferably wherein the metal ions are rare earth metal ions excluding thorium. In a still further preferred embodiment, the amount of metal-bearing material added to the condensed phosphoric acid is sufficient to provide a concentration of rare earth metal ions (excluding thorium) in the leaching solution of up to around 80 g/L.

In a particularly preferred embodiment, the precipitate containing metal ions comprises monazite. Preferably, the precipitate has a particle size of less than 15 μm. In some embodiments of the process, the precipitate is separated from its supernatant by decanting, by filtration, or by centrifugation; most preferably by centrifugation.

In a preferred embodiment, the process further comprises the step of treating the precipitate with caustic soda to produce metal ion hydroxides. In a particularly preferred embodiment, the precipitate comprises monazite and the process further comprises the step of treating the monazite with caustic soda to produce metal ion hydroxides, wherein the treatment with caustic soda takes place at ambient temperature and for less than 1 hour. This represents a significant improvement in temperatures and residence times required for conventional caustic cracking of monazite and avoids the need for hazardous grinding of the material.

Another embodiment of the present invention provides metals recovered by the process of the invention.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
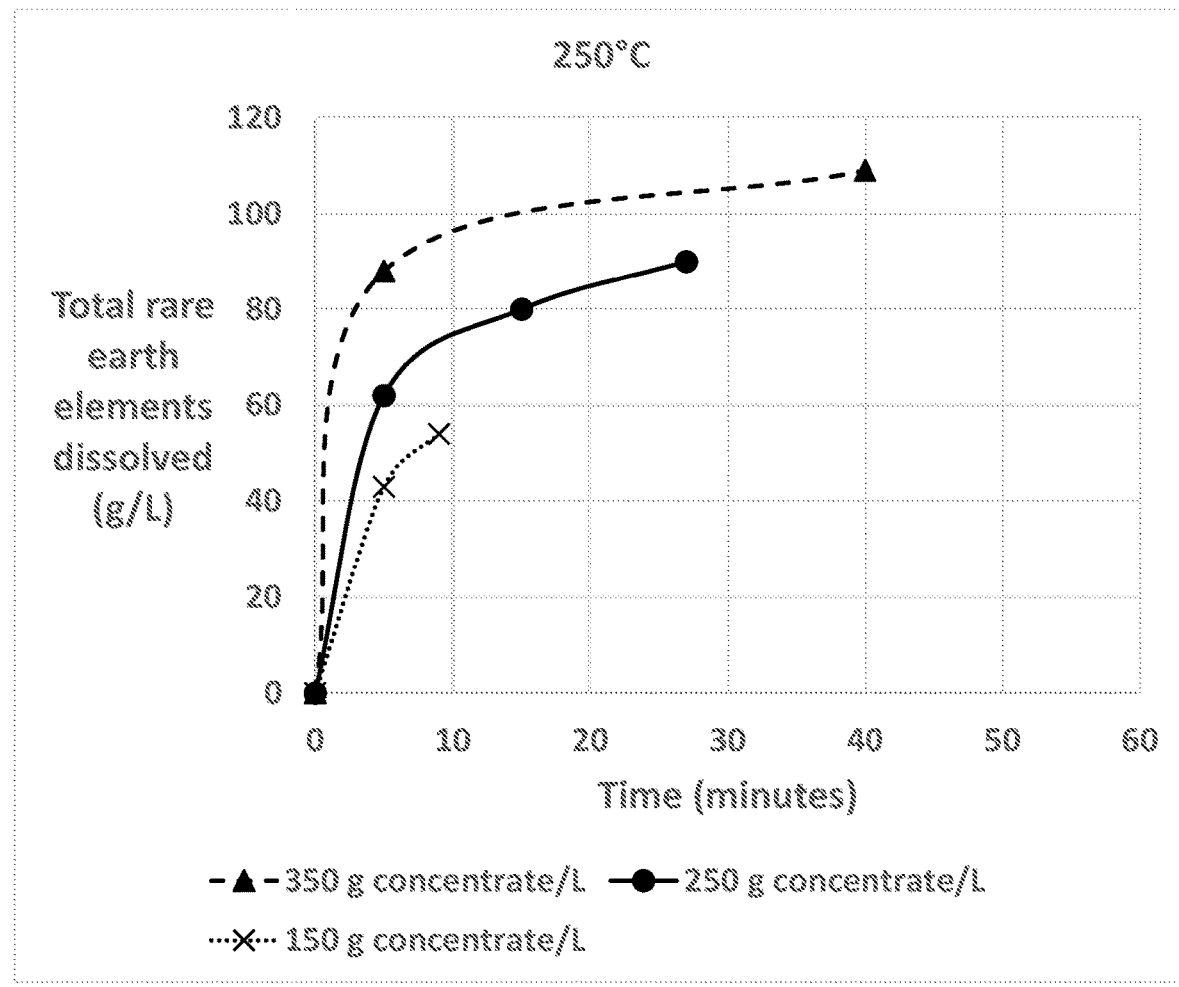
FIG. 1 is a graph showing the difference in dissolution behaviour of various concentrations of monazite concentrate at 250° C.

The present invention relates to a process for recovering metals from metal-bearing material, said process comprising the step of contacting the metal-bearing material with condensed phosphoric acid at a temperature of greater than 215° C. and less than 300° C. for a period of time sufficient to at least partially dissolve the metal-bearing material; to provide a leaching solution containing metal ions.

The process is particularly applicable for the recovery of the rare earth metals (also known as rare earth elements) and thorium and uranium, which are often found in minerals along with the rare earth metals. Preferred metals that can be recovered using the present invention are selected from the list comprising cerium, dysprosium, erbium, europium, gadolinium, holmium, lanthanum, lutetium, neodymium, praseodymium, promethium, samarium, scandium, terbium, thulium, ytterbium, yttrium, thorium, uranium, and mixtures thereof. More preferably, the metals are selected from the list comprising lanthanum, cerium, neodymium, praseodymium, yttrium, samarium, gadolinium, scandium, thorium, uranium and mixtures thereof.

The process of the present invention is applicable to metal-bearing materials such as phosphate minerals containing rare earth metals, as well as thorium and uranium. Particularly suitable phosphate minerals include monazite and xenotime, which are often found together in ores and mineral sand deposits. In a preferred embodiment of the present invention, the metal-bearing material comprises a monazite concentrate. As the skilled person will appreciate, monazite concentrates are often found with a variety of other minerals, including xenotime, silica, magnetite, ilmenite, rutile, zircon and garnet. Therefore, in the preferred embodiment of the present invention, the monazite concentrate comprises minerals selected from the list comprising monazite, silicates, zircon, xenotime, rutile and mixtures thereof.

Condensed phosphoric acid (CPA), also known as 'strong' phosphoric acid in the literature, is a mixture of orthophosphoric acid ($H_3PO_4$), pyrophosphoric acid ($H_4P_2O_7$), triphosphoric acid ($H_5P_3O_{10}$) and the polyphosphoric acids. Heating a mixture of orthophosphoric acid and water to higher than about 180° C. will result in an appreciable amount of pyrophosphoric acid (about 1% by weight) forming from a condensation reaction of two orthophosphoric acid molecules (Ohashi & Sugatani, 1957). Condensation reactions continue with higher temperatures to produce more of these 'condensed' phosphate mixtures as shown in Table 1.

TABLE 1

Production of condensed phosphoric acid with temperature

| Temp (° C.) | Orthophosphoric acid (wt. %) | Pyrophosphoric acid (wt. %) | Triphosphoric acid (wt. %) | Tetraphosphoric acid (wt. %) | Water (wt. %) |
| --- | --- | --- | --- | --- | --- |
| 161 | 86.3 | | | | 13.7 |
| 183 | 90.9 | 1.1 | | | 8.0 |
| 203 | 89.9 | 4.4 | | | 5.8 |
| 220 | 90.5 | 4.2 | | | 5.3 |
| 244 | 90.0 | 5.0 | | | 5.0 |
| 260 | 89.8 | 8.1 | 0.3 | | 1.8 |
| 280 | 66.1 | 29.3 | 4.6 | | |
| 301 | 53.8 | 39.5 | 6.8 | | |
| 340 | 29.4 | 47.4 | 22.7 | 0.5 | |

It is preferred that the process of the present invention is conducted at a temperature of between 230° C. and 275° C., preferably around 265° C. While the process is effective at temperatures of greater than 215° C., an effective balance of orthophosphoric acid, pyrophosphoric acid, triphosphoric acid with minimal water present is preferred as this allows the process to be carried out with shorter residence times. Additionally, the Applicants have observed detrimental effects at temperatures of 275° C. and higher in that an irreversible precipitate can form. Thus, a temperature of around 265° C. appears to be optimal for dissolution in order to avoid this problem.

In the process of the present invention, it is preferred that at least around 70% of the metal-bearing material is dissolved in the condensed phosphoric acid, preferably at least around 80%, more preferably at least around 90%, at least around 91%, at least around 92%, at least around 93%, at least around 94%, even more preferably at least around 95%, at least around 96%, at least around 97%, at least around 98%, most preferably at least around 99%. The more metal-bearing material that is dissolved then the more efficient the process becomes. In some embodiments, the undissolved leach solid or gangue will comprise largely silicates.

In the process of the present invention, it is preferred that the period of time sufficient to at least partially dissolve the metal-bearing material is between 5 and 60 minutes, preferably around 15 minutes. In other words, the preferred residence time for the process of the present invention is between 5 and 60 minutes, preferably around 15 minutes. This is a significant improvement over the long residence times of the conventional processes.

It is preferred that the metal-bearing material used in the present invention has a particle size of less than 0.5 mm in diameter. It is particularly preferred that the metal-bearing material used in the present invention has a particle size of between 100 μm and 400 μm. This maximises the surface area of the metal-bearing material and reduces residence time while avoiding the need for fine-grinding required by conventional processes.

In a preferred embodiment of the present invention, the amount of metal-bearing material added to the condensed phosphoric acid is between around 50 and 350 g/L, preferably around 250 g/L. The skilled person will appreciate that the quality of the metal-bearing material will vary from batch to batch and so it is generally preferred to add enough of the metal-bearing material to provide a leaching solution which has a concentration of metal ions of up to around 130 g/L, preferably wherein the metal ions are rare earth metal ions excluding thorium. In some preferred embodiments of the present invention, the amount of metal-bearing material added to the process is sufficient to provide a concentration of rare earth metal ions (excluding thorium) in the leaching solution of up to around 130 g/L, or up to around 120 g/L, or up to around 110 g/L, or up to around 100 g/L, or up to around 90 g/L, or up to around 80 g/L, or up to around 70 g/L, or up to around 60 g/L, or up to around 50 g/L, or up to around 40 g/L, or up to around 30 g/L. In a more preferred embodiment, the amount of metal-bearing material added to the process is sufficient to provide a concentration of rare earth metal ions (excluding thorium) in the leaching solution of up to around 80 g/L.

When dissolution of the metal-bearing material is partial, the process further comprises a step of separating the leaching solution from any undissolved leach solid. The leaching solution is separated from the undissolved leach solid by any suitable technique familiar to the skilled person such as decanting, by filtration, or by centrifugation. Preferably, the leaching solution is separated from the undissolved leach solid by decanting the leaching solution into another vessel.

The leaching solution contains metal ions which are available for recovery. In a preferred embodiment, the concentration of metal ions dissolved in the leaching solution is up to around 130 g/L, preferably wherein the metal ions are rare earth metal ions excluding thorium. In some embodiments, the concentration of rare earth metal ions (excluding thorium) in the leaching solution is up to around 130 g/L, or up to around 120 g/L, or up to around 110 g/L, or up to around 100 g/L, or up to around 90 g/L, or up to around 80 g/L, or up to around 70 g/L, or up to around 60 g/L, or up to around 50 g/L, or up to around 40 g/L, or up to around 30 g/L. In a more preferred embodiment, the concentration of rare earth metal ions (excluding thorium) in the leaching solution is up to around 80 g/L.

The metal ions may at least partially be recovered from the leaching solution with the use of sorbents, for example adsorption onto activated carbon, magnetite, novel biomass sorbents or synthetic sorbents; ion exchange resins; or by filtration, for example by membranes or beads of resin. In some embodiments, the process of the present invention further comprises the step of at least partially extracting the metal ions from the leaching solution using ion exchange processes, such as diluting the leaching solution with water and contacting it with an ion exchange resin. Ion exchange processes can be used to preferentially recover rare earths directly from the diluted leaching solution. Rare earth metal and impurity ions adsorbed by the resin can then be stripped in separate stages using an eluent in different concentrations such as hydrochloric acid. The resulting mixed rare earth solution can then be sent for separation into individual rare earths metals or sold as a mixed commercial product.

One method is to allow the leaching solution to cool to about 80° C. and mix in distilled or deionised water (a higher temperature may cause the water to volatilise and boil off) in order to lower the viscosity of the solution, which is then treated with ion-exchange for recovery of rare earths.

Alternatively, the metal ions may at least partially be recovered from the leaching solution through filtration by membranes or nano-beads of resin. Such filters are also in use to extract rare earths from wet-process phosphoric acid.

It is generally preferred that the metal ions are at least partially recovered by precipitation of the leaching solution to form a precipitate containing metal ions. This may happen following a step of partial extraction with sorbents or filters or it may happen in place of that step. Preferably, the precipitate is formed by modifying the pH or temperature of the leaching solution or by modifying the dielectric constant of the leaching solution. For example, the precipitate may be formed by cooling the leaching solution and diluting the leaching solution with the addition of orthophosphoric acid, water, alcohol, or mixtures thereof. The skilled person will appreciate that any water-soluble alcohol is suitable for use in this step such as, for example, methanol, ethanol, isopropyl alcohol and propanol.

One method is to precipitate the rare earths from the leaching solution at lower than 200° C. with water added in order to produce an ultrafine monazite which can be feed to an instantaneous form of caustic cracking done at ambient temperature. Adding water can be volatile, so a method to add water is to add phosphoric acid with enough water to create the right composition in the condensed phosphoric acid.

Other precipitation methods include raising the pH and lowering the dielectric constant of the solution. A saturated solution at about 130 g of rare earth elements per litre can be precipitated by a simple addition of water to double the volume. Adding alcohol to a nearly saturated solution will also lower the dielectric constant by enough to cause precipitation.

The precipitate containing metal ions can then be subject to further treatment such as a caustic cracking process similar to the conventional process.

In a particularly preferred embodiment of the present invention, the precipitate formed from the leaching solution comprises monazite, preferably having a particle size of less than 15 μm. This ultrafine monazite can then be separated from its supernatant, the remaining leaching solution, by any suitable technique familiar to the skilled person such as decanting, by filtration, or by centrifugation. Preferably, the precipitate is separated from its supernatant by centrifugation. The ultrafine monazite can then be treated with caustic soda to produce metal ion hydroxides. This caustic cracking process is similar to the conventional caustic cracking process except that it avoids the need for fine grinding the monazite and also proceeds at ambient temperature and in a much shorter timeframe (less than 1 hr) which means it is far safer and more economical than the conventional process.

Once the metals have been recovered from the leaching solution, in some embodiments of the invention, the leach solution may be regenerated to condensed phosphoric acid and reused for further dissolution of metal-bearing material.

Another embodiment of the present invention provides metals recovered by the process of the invention. The process of the present invention is particularly applicable to the recovery of rare earth metals, as well as thorium and uranium. The metals may be recovered in the form of metal solid, such as a dried metal powder, or in the form of metal compounds, such as metal phosphates, metal oxalates, metal carbonates, metal hydroxides, metal chlorides, metal sulphates, metal oxides or mixtures thereof. These metal compounds may be recovered in solution or precipitated or otherwise isolated to form solid products such as powders. Preferably, the metals or metal ions recovered are selected from the list comprising cerium, dysprosium, erbium, europium, gadolinium, holmium, lanthanum, lutetium, neodymium, praseodymium, promethium, samarium, scandium, terbium, thulium, ytterbium, yttrium, thorium, uranium, and mixtures thereof. More preferably, the metals or metal ions are selected from the list comprising lanthanum, cerium, neodymium, praseodymium, yttrium, samarium, gadolinium, scandium, thorium, uranium and mixtures thereof. In some preferred embodiments, a mixture of rare earth metal chlorides is recovered which is a useful commercial product.

The term "and/or" as used herein is to be taken as specific disclosure of each of the two specified features or components with or without the other. For example, "A and/or B" is to be taken as specific disclosure of each of (i) A, (ii) B and (iii) A and B, just as if each is set out individually herein.

Examples

The invention will now be further explained and illustrated by reference to the following non-limiting examples.
General Experimental Information A monazite concentrate was obtained from a heavy mineral sands operation in eastern Australia for use in most of the experiments. The particle size distribution shown in Table 2 illustrates that most of the mass of the concentrate was greater than 120 μm in sieve diameter.

TABLE 2

Particle size distribution of monazite sand

| Upper size (μm) | Lower size (μm) | Mass (%) |
|---|---|---|
| 100 | 40 | 0.7 |
| 120 | 100 | 11.7 |
| 140 | 120 | 19.7 |

TABLE 2-continued

Particle size distribution of monazite sand

| Upper size (μm) | Lower size (μm) | Mass (%) |
|---|---|---|
| 170 | 140 | 34.6 |
| 230 | 170 | 33 |
| 320 | 230 | 0.3 |

The assay of the rare earths in the monazite concentrate is shown in Table 3. Monazite represented about 90% of the mass of minerals in the concentrate with the remaining 10% being made up of silicates, zircon, and a minor amount of xenotime. Total rare earth metal represents about 40% of the mass of the monazite.

TABLE 3

Elemental assay of monazite concentrate

| Element | Mass % |
|---|---|
| P | 12.1 |
| La | 9.3 |
| Ce | 19.5 |
| Nd | 8.0 |
| Pr | 2.0 |
| Y | 0.9 |
| Th | 7.1 |

Three other monazite concentrates were obtained. They originated from deposits in Mozambique and in Western Australia (Perth and Bunbury). They had very similar assays to Table 3 above.

Cationic, strong acid, ion exchange resins Dowex 50WX2, Purolite C100H and Purolite C160 were obtained from the manufacturers.

Dissolution Experiments

For each dissolution experiment, 40 mL of orthophosphoric acid (85% by mass) analytical grade was poured into a 100 mL beaker and heated on a hotplate-stirrer with a magnetic stir bar on 600 rpm. When the target temperature was reached, a weighed amount of dry monazite concentrate sand was added. The temperatures and amounts of monazite sand used in each example are outlined in Table 4. After a set time, the stirrer was switched off and the beaker was taken off the hotplate. After one minute to allow settling of particles, the solution in the beaker was decanted into a conical flask. If the solution were being stored for a later use, the flask would be stoppered to minimise the solution absorbing moisture from the air. The residue from the leach was washed in water and allowed to dry before weighing to determine the mass dissolved. The mass dissolved was correlated to analysis of the solution by ICP-AES to determine that the mass dissolved was from rare earth minerals.

TABLE 4

Temperatures and amounts of monazite sand used in Examples 1 to 8

| Example No. | Temperature (° C.) | Amount of monazite sand added (g/L) |
|---|---|---|
| 1 | 250 | 150 |
| 2 | 250 | 250 |
| 3 | 250 | 350 |
| 4 | 203 | 250 |
| 5 | 225 | 250 |
| 6 | 250 | 250 |
| 7 | 265 | 250 |
| 8 | 275 | 250 |

FIG. 1 shows the difference in dissolution behaviour at 250° C. when differing amounts of monazite concentrate were added at the start (Examples 1-3). When the lower two amounts of 250 g/L and 150 g/L were added at the start, the dissolution was complete in less than 30 minutes. No xenotime was left in the residue. When the higher amount of 350 g/L was added, the dissolution slowed at about 250 g per litre dissolved, indicating that an approach to saturation was slowing the dissolution. Nevertheless within 15 minutes, 80% of the monazite in the 350 g/L sample had dissolved.

Figure 2:
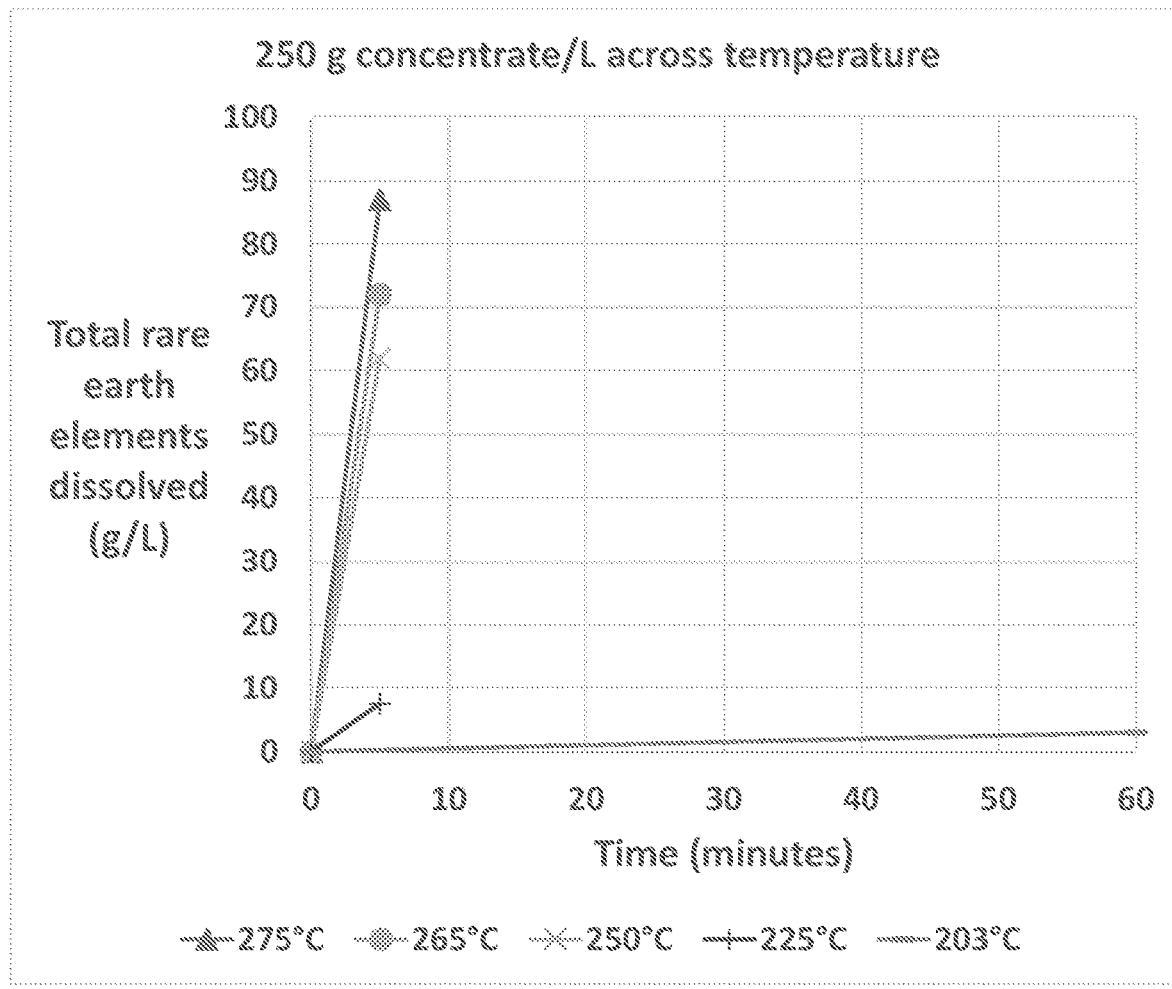
FIG. 2 is a graph showing the effect of temperature on the dissolution rate with a starting feed of 250 g of concentrate per litre.

FIG. 2 shows the effect of temperature on the dissolution rate with a starting feed of 250 g of concentrate per litre (Examples 4-8). It is clear that the dissolution rate increases markedly at temperatures higher than 225° C. A problem encountered at temperatures of 275° C. and higher is that an irreversible precipitate may form. Thus, a temperature of around 265° C. appears to be optimal for dissolution in order to avoid this problem.

Example 2 was repeated with the monazite concentrates from Mozambique, Perth and Bunbury with full dissolution achieved.

In addition to the concentrate of monazite sand, three types of synthetic crystals of xenotime were tested. They were a pure yttrium phosphate, and yttrium phosphate doped with 1% neodymium, and a pure lutetium phosphate (Examples 9-11, Table 5). These crystals were a few millimetres in diameter so were crushed to less than 1 mm.

TABLE 5

Examples 9 to 11

| Example No. | Synthetic Xenotime |
|---|---|
| 9 | yttrium phosphate |
| 10 | yttrium phosphate doped with 1% neodymium |
| 11 | lutetium phosphate |

The xenotime crystals, although substantially larger than the concentrate from the mineral sands operation, were all largely dissolved within 1.5 hours at a temperature of 265° C. This shows that the present method is effective for dissolving xenotime.

It was found that the leaching solution carrying rare earth metals and other ions can be sent through directly to ion exchange or solvent extraction in order to recover the metal ions.

Sorption Experiments

The sorption experiments generally followed a flowsheet comprising some or all of the following steps: leaching, dilution with deionised/distilled water, contact with sorptive material, screening, and one or more stripping stages.

For each ion exchange experiment, a leaching solution was prepared using a similar method to that outlined above for the dissolution experiments except that the leaching solution was not decanted from the residual solids. The leaching conditions used in each example are outlined in Table 6. The leaching time for each experiment was ~30 mins. The resulting leaching solution from each example was mixed with deionised or distilled water in order to lower the viscosity. The dilution ratio in Table 6 represents the ratio of the undiluted volume to the diluted volume of the leaching solution. It was found that the diluted leaching solution remains stable for up to a week, after which precipitation tends to occur.

After the diluted solution was left to cool to ambient temperature, an amount of cationic, strong acid, ion exchange resin was added to the solution and the suspension was gently mixed for the duration of the experiment. The type of resin, the amount of resin per litre of diluted leaching solution, and the contact time of the beads with the solution are outlined in Table 6. After the contact time, the solution and beads were screened with a 300 μm aperture sieve which retained the beads and allowed the solution and the solid particles of leach residue to pass through. The beads were washed on the screen with deionised/distilled water to remove residual solution. The beads were then transferred to another container for elution or stripping. A series of aliquots of solution (300 mL) were mixed with the resin for ten minutes and drained away and sampled. The first aliquot was deionised/distilled water again. The second and subsequent aliquots had a higher concentration of hydrochloric acid.

TABLE 6

Examples 12 to 20

Leaching conditions

| Example No. | Temp. (° C.) | Amount of monazite sand added (g/L) | Dilution ratio of leach | Resin type | Resin amount (g/L) | Contact time (h) |
|---|---|---|---|---|---|---|
| 12 | 250 | 125 | 1:2.5 | Purolite C100H | 400 | 1 |
| 13 | 260 | 125 | 1:5 | Purolite C100H | 400 | 1 |
| 14 | 250 | 125 | 1:2.5 | Purolite C100H | 400 | 2 |
| 15 | 240 | 125 | 1:2.5 | Dowex 50WX2 | 400 | 2 |
| 16 | 240 | 125 | 1:2.5 | Purolite C100H | 800 | 2 |
| 17 | 260 | 125 | 1:2.5 | Purolite C100H | 400 | 2 |
| 18 | 260 | 125 | 1:2.5 | Purolite C160 | 400 | 2 |
| 19 | 250 | 250 | 1:2.5 | Purolite C100H | 400 | 2 |
| 20 | 250 | 250 | 1:2.5 | Purolite C160 | 400 | 2 |

Table 7 shows how much of each element was dissolved from 125 g/L monazite concentrate at different temperatures. The concentration of each element in the diluted leaching solution was measured by ICP-MS. As these results show, 30 minutes is sufficient for most of the rare earth elements, thorium and uranium to be 100% dissolved. Notably, the element zirconium is not dissolving which strongly suggests that the mineral zircon is not dissolving. Some of the elements were omitted due to low precision.

TABLE 7

Dissolution of elements from 125 g/L of monazite concentrate after 30 minutes in leaching solution at different temperatures

| | Leaching temperature | | |
|---|---|---|---|
| | 240° C. (Example 16) | 250° C. (Example 12) | 260° C. (Example 17) |
| Element | | % dissolution | |
| Al | 56 | 42 | 70 |
| Ca | 100 | 100 | 100 |
| Ce | 100 | 98 | 91 |
| Dy | 100 | 81 | 100 |
| Gd | 99 | 99 | 99 |
| Ho | 84 | 84 | 84 |
| La | 100 | 100 | 99 |
| Nd | 100 | 100 | 100 |
| Pb | 100 | 73 | 100 |
| Pr | 100 | 100 | 100 |
| Sm | 100 | 95 | 100 |
| Tb | 100 | 100 | 100 |
| Th | 76 | 89 | — |
| Ti | 87 | 87 | 87 |
| U | 100 | 100 | 100 |
| Y | 94 | 86 | 94 |
| Zr | 0 | 0 | — |

Table 8 shows how much of each element was dissolved from 125 g/L and 250 g/L of monazite concentrate at 250° C. The concentrations of each element in the diluted leach solution was measured by ICP-MS. These results show that most of the rare earth elements, thorium and uranium will still dissolve in 30 minutes if a greater amount of monazite concentrate is added (250 g/L).

TABLE 8

Dissolution of elements from 125 g/L and 250 g/L of monazite concentrate after 30 minutes in leaching solution at 250° C.

| | Monazite added (g/L) | |
|---|---|---|
| | 125 g/L (Example 12) | 250 g/L (Example 19) |
| Element | % dissolution | |
| Al | 42.3 | 42.3 |
| Ca | 100 | 100 |
| Ce | 97.8 | 97.8 |
| Dy | 80.7 | 94.1 |
| Gd | 98.5 | 100 |
| Ho | 83.7 | 83.7 |
| La | 100 | 100 |
| Nd | 100 | 100 |
| Pb | 72.9 | 100 |
| Pr | 100 | 93.5 |
| Sm | 95.3 | 100 |
| Tb | 100 | 100 |
| Th | 88.9 | — |
| Ti | 87.0 | 87.0 |
| U | 100 | 100 |
| Y | 85.8 | 90.1 |
| Zr | 0.0 | — |

Table 9 shows how much of each rare earth in the diluted leaching solution was sorbed onto the resin in Examples 12 to 20. This was calculated from the concentrations of each element left in the leaching solution after sorption. It can be seen that a high proportion of rare earths will sorb onto the resin with a minimal contact time of 1 to 2 hours. An increase in contact time from 1 to 2 hours from Example 13 to Example 14 leads to an increase in the proportion of rare earths sorbed from the diluted leaching solution. The use of a greater amount of resin (800 g/L) in Example 16 achieved the highest proportions of rare earth sorbed. Sorption was significant for the different cationic, strongly acidic ion exchange resins used in examples 15, 17 and 18. A doubling of the amount of monazite sands used (and therefore doubling the rare earth ions present) in the diluted leaching solution in Examples 19 and 20 led to a lower proportion of rare earth sorbed onto resins.

TABLE 9

Percentage of rare earths sorbed from the leaching solution in Examples 12-20

| Element | Example | | | | | | | | |
|---|---|---|---|---|---|---|---|---|---|
| | 12 | 13 | 14 | 15 | 16 | 17 | 18 | 19 | 20 |
| | % sorbed from leaching solution | | | | | | | | |
| Ce | 51 | — | 77 | 42 | 86 | 50 | 30 | 29 | 20 |
| Dy | 19 | — | 33 | 37 | 71 | 37 | 28 | 15 | 13 |
| Er | 18 | — | 33 | 38 | 69 | 32 | 23 | 19 | 14 |
| Gd | 14 | — | 60 | 27 | 68 | 29 | 20 | 20 | 16 |
| Ho | 30 | — | — | 26 | — | 23 | 12 | 15 | 10 |
| La | 66 | — | 83 | 49 | 100 | 64 | 41 | 40 | 26 |
| Nd | 38 | — | 67 | 40 | 90 | 39 | 24 | 21 | 16 |
| Pr | 43 | — | 63 | 47 | — | 58 | 43 | 22 | 14 |
| Sm | 20 | — | 56 | 29 | 85 | 31 | 23 | 21 | 22 |
| Tb | 19 | — | 60 | 27 | — | 28 | 20 | 15 | 12 |
| Y | 39 | — | 50 | 33 | — | 33 | 20 | 21 | 14 |

Table 10 shows the concentrations of elements eluted from the resin in Example 12 in a series of solutions, each with a different concentration of aqueous hydrochloric acid. Given that the resin had already been washed with deionised/distilled water, Table 10 shows the difficulty of removing phosphorus with water. It shows that a weak solution of acid such as aqueous hydrochloric acid is necessary to remove the remaining phosphorus.

When the resin was contacted with HCl (0.12 M), a colloidal precipitate formed. The precipitate was redissolved and found to be made of calcium phosphate.

It can be seen in Table 10 that a concentration of HCl (0.4 M) will begin to remove impurities Ca, Pb and Ti while the levels of rare earth elements are still close to the detection limits. This concentration of HCl should provide separation from the rare earths, however, a slightly higher concentration may effect a faster removal of impurities.

Table 10 shows a concentration of HCl of 2 M and higher will elute the rare earths from the resin in higher concentrations. Notably, Table 10 also shows that no uranium or thorium has eluted from the resins at any stage.

TABLE 10

Concentrations of elements eluted from the resin of Example 12

| | HCl concentration (mol/L) | | | | |
|---|---|---|---|---|---|
| | 0 | 0.12 | 0.4 | 2 | 6 |
| Element | Concentration of element (ppm) | | | | |
| Al | 2 | 2 | 1 | 8 | 7 |
| Ca | — | 7 | 14 | 65 | 63 |
| Ce | <1 | <1 | 6 | 534 | 717 |
| Dy | <0.5 | <0.5 | <0.5 | 9 | 9.5 |
| Er | <0.1 | <0.1 | <0.1 | 1.9 | 1.8 |
| Eu | <0.5 | <0.5 | <0.5 | 0.5 | 1 |
| Fe | 5 | 5 | 5 | 8 | 9 |
| Gd | <0.5 | <0.5 | <0.5 | 24.5 | 28.5 |
| Ho | <0.1 | <0.1 | <0.1 | 1.1 | 1.1 |
| La | <1 | 1 | 1 | 249 | 336 |
| Lu | <0.2 | <0.2 | <0.2 | <0.2 | <0.2 |
| Nd | <1 | <1 | <1 | 237 | 310 |
| P | 3488 | 521 | 45 | 7 | 2 |
| Pb | <1 | <1 | 3 | 38 | 4 |
| Pr | 4 | 1 | 3 | 68 | 90 |
| Si | 2 | 3 | 3 | 4 | 6 |
| Sm | <0.5 | <0.5 | <0.5 | 37.5 | 49 |
| Tb | <0.1 | <0.1 | <0.1 | 2.5 | 2.8 |
| Th | 3.5 | 0.5 | <0.5 | <0.5 | <0.5 |
| Ti | <1 | 2 | 15 | 505 | 1523 |
| Tm | <0.1 | <0.1 | <0.1 | 0.2 | 0.1 |
| U | <0.5 | <0.5 | <0.5 | <0.5 | <0.5 |
| Y | <0.5 | <0.5 | <0.5 | 28 | 27 |
| Yb | <0.1 | <0.1 | <0.1 | 0.4 | 0.3 |
| Zr | <1 | <1 | <1 | <1 | <1 |

Filtration and Precipitation Experiments

It was also found that the leaching solution can be sent to filtration by membranes or nano-beads of resin or other adsorbents.

Alternatively, it was found that the rare earths can be precipitated from the solution for further treatment. The precipitation experiments generally followed a flowsheet comprising some or all of the following steps: leaching; decanting; precipitation by dilution, lowering the temperature, raising the pH and/or lowering the dielectric constant of the leaching solution; centrifuging/filtration; and caustic cracking.

One method precipitated the rare earths from the leaching solution at a temperature of lower than 200° C. with water and/or phosphoric acid added in order to produce an ultrafine monazite precipitate. This ultrafine monazite precipitate was then used as feed in a rapid form of caustic cracking performed at ambient temperature with a residence time of less than 30 minutes. Specifically, the precipitate was contacted with 45% aqueous sodium hydroxide without heating. It appeared to decompose immediately and was checked again after 5 minutes to confirm. The resultant hydroxide precipitate was readily dissolved in hydrochloric acid to form metal chlorides.

Other precipitation methods include raising the pH and lowering the dielectric constant of the leaching solution. A saturated solution at about 130 g/L of rare earth elements was precipitated by a simple addition of water to double the volume. Adding alcohol to a nearly saturated solution also sufficiently lowered the dielectric constant enough to cause precipitation. Suitable alcohols for this step which have been used successfully include methanol, ethanol, isopropyl alcohol and propanol, although the skilled person would recognise that any water-soluble alcohol would have this effect. The precipitate can then be used in subsequent processes such as the caustic cracking protocol outlined above.

It was found that the loss of rare earth metals downstream of the leaching stage is roughly equivalent to those observed with conventional caustic cracking process although, as previously discussed, the present process offers significant improvement in temperatures and residence times required for conventional caustic cracking of monazite and avoids the need for hazardous grinding of the material.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A process for recovering metals from a metal-bearing material, said process comprising:
   contacting the metal-bearing material with condensed phosphoric acid at a temperature of greater than 215° C. and less than 275° C. for a period of time sufficient to at least partially dissolve the metal-bearing material to provide a leaching solution containing metal ions,
   wherein the amount of metal-bearing material added to the condensed phosphoric acid is between around 50 and 350 g/L,
   wherein the metal-bearing material is a phosphate mineral selected from monazite and xenotime,
   wherein at least 80% of the metal-bearing material is dissolved in the condensed phosphoric acid.

2. The process of claim 1, wherein when dissolution of the metal-bearing material is partial, the process further comprises a step of separating the leaching solution from any undissolved leach solid.

3. The process of claim 1, further comprising at least partially extracting the metal ions from the leaching solution using sorbents and/or filtration, or using ion exchange resins.

4. The process of claim 3, wherein the at least partial extraction of the metal ions from the leaching solution comprises diluting the leaching solution with deionised/distilled water; and contacting the diluted leaching solution with a sorptive material, wherein the sorptive material is a cationic ion exchange resin.

5. The process of claim 1, further comprising forming a precipitate containing metal ions from the leaching solution.

6. The process of claim 5, wherein the precipitate is formed by modifying the pH of the leaching solution or by modifying the dielectric constant of the leaching solution.

7. The process of claim 5, wherein the precipitate is formed by cooling the leaching solution and adding orthophosphoric acid, water, alcohol, or mixtures thereof.

8. The process of claim 1, wherein the temperature is between 230° C. and 275° C.

9. The process of claim 1, wherein the period of time is between 5 and 60 minutes.

10. The process of claim 1, wherein the metal-bearing material has a particle size of less than 0.5 mm in diameter.

11. The process of claim 1, wherein the metals are selected from the group consisting of lanthanum, cerium, neodymium, praseodymium, yttrium, samarium, gadolinium, scandium, thorium, uranium and mixtures thereof.

12. The process of claim 1, wherein the leaching solution is separated from the leach solid by decanting, by filtration, or by centrifugation.

13. The process of claim 1, wherein the amount of metal-bearing material added to the condensed phosphoric acid is sufficient to provide a concentration of metal ions dissolved in the leaching solution of up to around 130 g/L, wherein the metal ions are rare earth metal ions excluding thorium.

14. The process of claim 13, wherein the amount of metal-bearing material added to the condensed phosphoric acid is sufficient to provide a concentration of rare earth metal ions (excluding thorium) in the leaching solution of up to around 80 g/L.

15. The process of claim 5, wherein the precipitate comprises monazite.

16. The process of claim 5, wherein the precipitate has a particle size of less than 15 μm.

17. The process of claim 5, wherein the precipitate is separated from its supernatant by decanting, by filtration, or by centrifugation.

18. The process of claim 15, further comprising the step of treating the precipitate with caustic soda to produce metal ion hydroxides.

* * * * *